US012677318B2

(12) United States Patent
Stefanatos et al.

(10) Patent No.: US 12,677,318 B2
(45) Date of Patent: Jul. 7, 2026

(54) COT-SHARING TECHNIQUES BASED ON A NON-ZERO PACKET PREPARATION DELAY

(71) Applicant: QUALCOMM Incorporated, San Diego, CA (US)

(72) Inventors: Stelios Stefanatos, San Diego, CA (US); Tien Viet Nguyen, Bridgewater, NJ (US); Arthur Gubeskys, San Diego, CA (US); Shuanshuan Wu, San Diego, CA (US); Parisa Cheraghi, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 18/030,053

(22) PCT Filed: Dec. 7, 2021

(86) PCT No.: PCT/US2021/062227
§ 371 (c)(1),
(2) Date: Apr. 3, 2023

(87) PCT Pub. No.: WO2022/132505
PCT Pub. Date: Jun. 23, 2022

(65) Prior Publication Data
US 2023/0379967 A1     Nov. 23, 2023

(30) Foreign Application Priority Data
Dec. 15, 2020     (GR) .............................. 20200100726

(51) Int. Cl.
*H04W 74/0816*     (2024.01)
*H04W 72/02*     (2009.01)
(Continued)

(52) U.S. Cl.
CPC ....... *H04W 74/0816* (2013.01); *H04W 72/02* (2013.01); *H04W 72/0453* (2013.01); *H04W 72/25* (2023.01)

(58) Field of Classification Search
CPC ............. H04W 74/0816; H04W 72/02; H04W 72/0453; H04W 72/25; H04W 16/14; H04W 72/20; H04W 74/0808
See application file for complete search history.

(56) References Cited

U.S. PATENT DOCUMENTS

2020/0196336 A1     6/2020   Zhou et al.
2021/0368351 A1*   11/2021   Cui ..................... H04W 74/002
(Continued)

FOREIGN PATENT DOCUMENTS

CN          110972275  A          4/2020
CN          111010891  A          4/2020
(Continued)

OTHER PUBLICATIONS

International Search Report and Written Opinion—PCT/US2021/062227—ISA/EPO—Apr. 4, 2022.
(Continued)

*Primary Examiner* — Ricky Q Ngo
*Assistant Examiner* — Kabir U Jahangir
(74) *Attorney, Agent, or Firm* — Procopio, Cory, Hargreaves & Savitch

(57)     ABSTRACT
A first UE may configure, during a COT, an initial transmission and one or more subsequent transmissions that follow the initial transmission. The one or more subsequent transmissions are configured to prevent a release of the COT. Based on the configuration, the first UE may transmit the initial transmission including an indication of the COT and a time period for transmitting the one or more subsequent transmissions. The first UE may subsequently transmit the one or more subsequent transmissions during the indicated time period. A second UE may receive the indication of the COT and the time period where the release of the COT is prevented. The second UE may prepare a packet for transmission during the time period where the release of the COT is prevented and transmit the packet during the COT following the time period where the release of the COT is prevented.

19 Claims, 13 Drawing Sheets

(51) Int. Cl.
*H04W 72/0453* (2023.01)
*H04W 72/25* (2023.01)

(56) References Cited

U.S. PATENT DOCUMENTS

| | | | | |
|---|---|---|---|---|
| 2023/0095487 A1* | 3/2023 | He | .................... | H04W 74/006 |
| | | | | 370/329 |
| 2023/0132437 A1* | 5/2023 | Lei | ...................... | H04L 5/0091 |
| | | | | 370/329 |
| 2023/0146161 A1* | 5/2023 | Sun | ................... | H04L 27/2607 |
| | | | | 370/329 |
| 2024/0163867 A1* | 5/2024 | Bagheri | ........... | H04W 72/1263 |

FOREIGN PATENT DOCUMENTS

| | | | |
|---|---|---|---|
| EP | 3817428 A1 | 5/2021 |
| WO | 2020024854 A1 | 2/2020 |
| WO | 2020033623 A1 | 2/2020 |
| WO | 2020193704 A1 | 10/2020 |
| WO | 2022021314 A1 | 2/2022 |

OTHER PUBLICATIONS

Huawei, et al., "Transmission with Configured Grant in NR Unlicensed Band," 3GPP Draft, 3GPP TSG RAN WG1 Meeting #96bis, R1-1903931, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Mar. 30, 2019, 19 Pages.

* cited by examiner

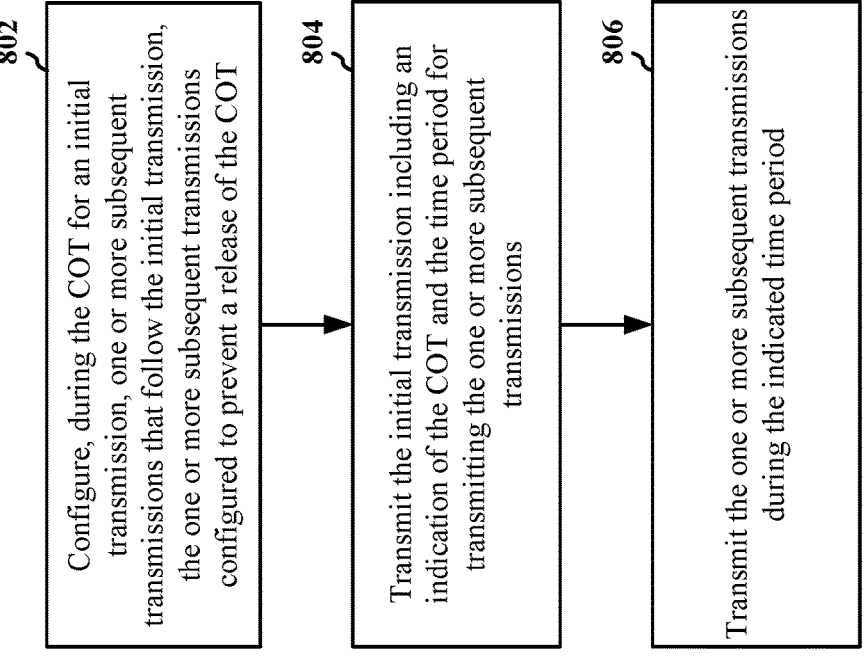

802 Configure, during the COT for an initial transmission, one or more subsequent transmissions that follow the initial transmission, the one or more subsequent transmissions configured to prevent a release of the COT 804 Transmit the initial transmission including an indication of the COT and the time period for transmitting the one or more subsequent transmissions 806 Transmit the one or more subsequent transmissions during the indicated time period

Figure 9:
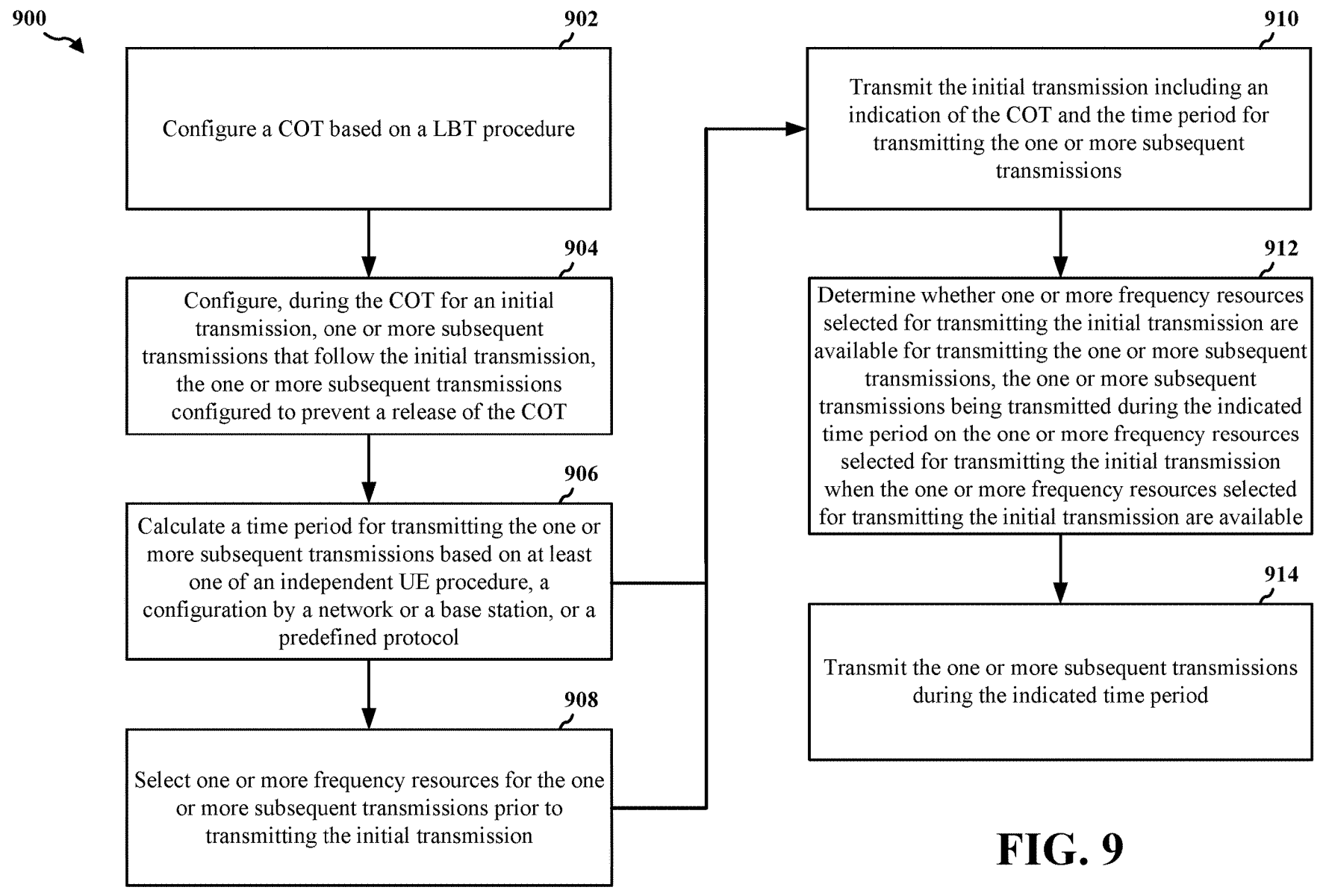

Transmit the initial transmission including an indication of the COT and the time period for transmitting the one or more subsequent transmissions

912

Determine whether one or more frequency resources selected for transmitting the initial transmission are available for transmitting the one or more subsequent transmissions, the one or more subsequent transmissions being transmitted during the indicated time period on the one or more frequency resources selected for transmitting the initial transmission when the one or more frequency resources selected for transmitting the initial transmission are available

914

Transmit the one or more subsequent transmissions during the indicated time period

902

Configure a COT based on a LBT procedure

904

Configure, during the COT for an initial transmission, one or more subsequent transmissions that follow the initial transmission, the one or more subsequent transmissions configured to prevent a release of the COT

906

Calculate a time period for transmitting the one or more subsequent transmissions based on at least one of an independent UE procedure, a configuration by a network or a base station, or a predefined protocol

908

Select one or more frequency resources for the one or more subsequent transmissions prior to transmitting the initial transmission

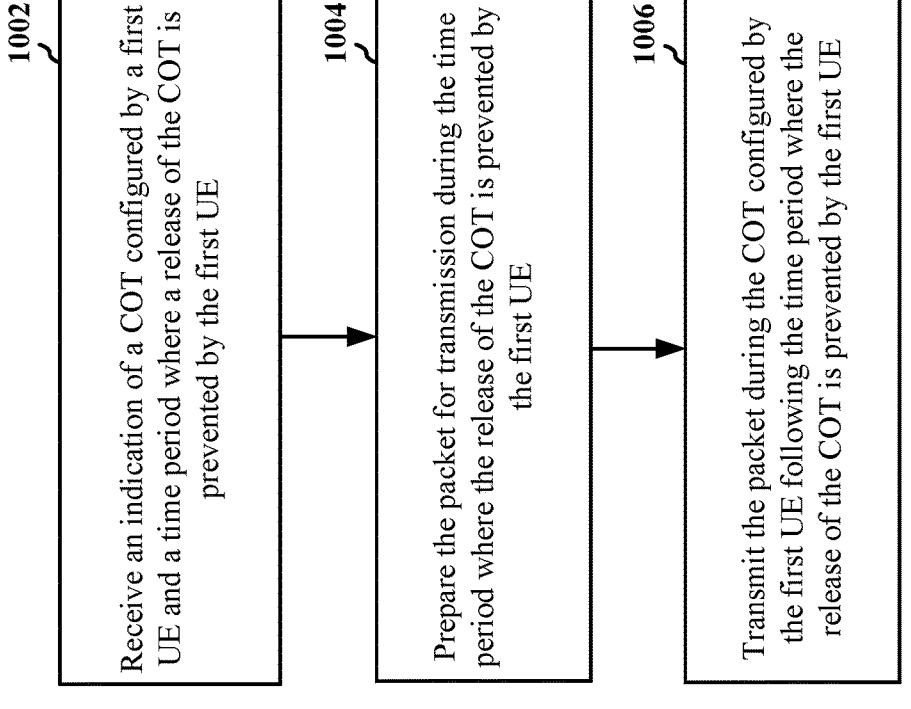

1000

1002

Receive an indication of a COT configured by a first UE and a time period where a release of the COT is prevented by the first UE

1004

Prepare the packet for transmission during the time period where the release of the COT is prevented by the first UE

1006

Transmit the packet during the COT configured by the first UE following the time period where the release of the COT is prevented by the first UE

FIG. 10

COT-SHARING TECHNIQUES BASED ON A NON-ZERO PACKET PREPARATION DELAY

CROSS REFERENCE TO RELATED APPLICATION(S)

This application is a National Stage Application filed under 35 U.S.C. § 371 of PCT International Application No. PCT/US2021/062227, entitled "COT-SHARING TECH-NIQUES BASED ON A NON-ZERO PACKET PREPARA-TION DELAY" and filed Dec. 7, 2021, which claims the benefit of and priority to Greek application No. 20200100726, entitled "COT-SHARING TECHNIQUES BASED ON A NON-ZERO PACKET PREPARATION DELAY" and filed on Dec. 15, 2020, which are expressly incorporated by reference herein in their entirety.

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may configure, during a channel occupancy time (COT) for an initial transmission, one or more subsequent transmissions that follow the initial transmission, the one or more subsequent transmissions configured to prevent a release of the COT; transmit the initial transmission including an indication of the COT and a time period for transmitting the one or more subsequent transmissions; and transmit the one or more subsequent transmissions during the indicated time period.

In an aspect of the disclosure, a method, a computer-readable medium, and an apparatus are provided. The apparatus may receive an indication of a COT configured by a first user equipment (UE) and a time period where a release of the COT is prevented by the first UE; prepare a packet for transmission during the time period where the release of the COT is prevented by the first UE; and transmit the packet during the COT configured by the first UE following the time period where the release of the COT is prevented by the first UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a flowchart of a method of wireless communication of a first UE.

FIG. 9 is a flowchart of a method of wireless communication of a first UE.

FIG. 10 is a flowchart of a method of wireless communication of a second UE.

DETAILED DESCRIPTION

Figure 1:
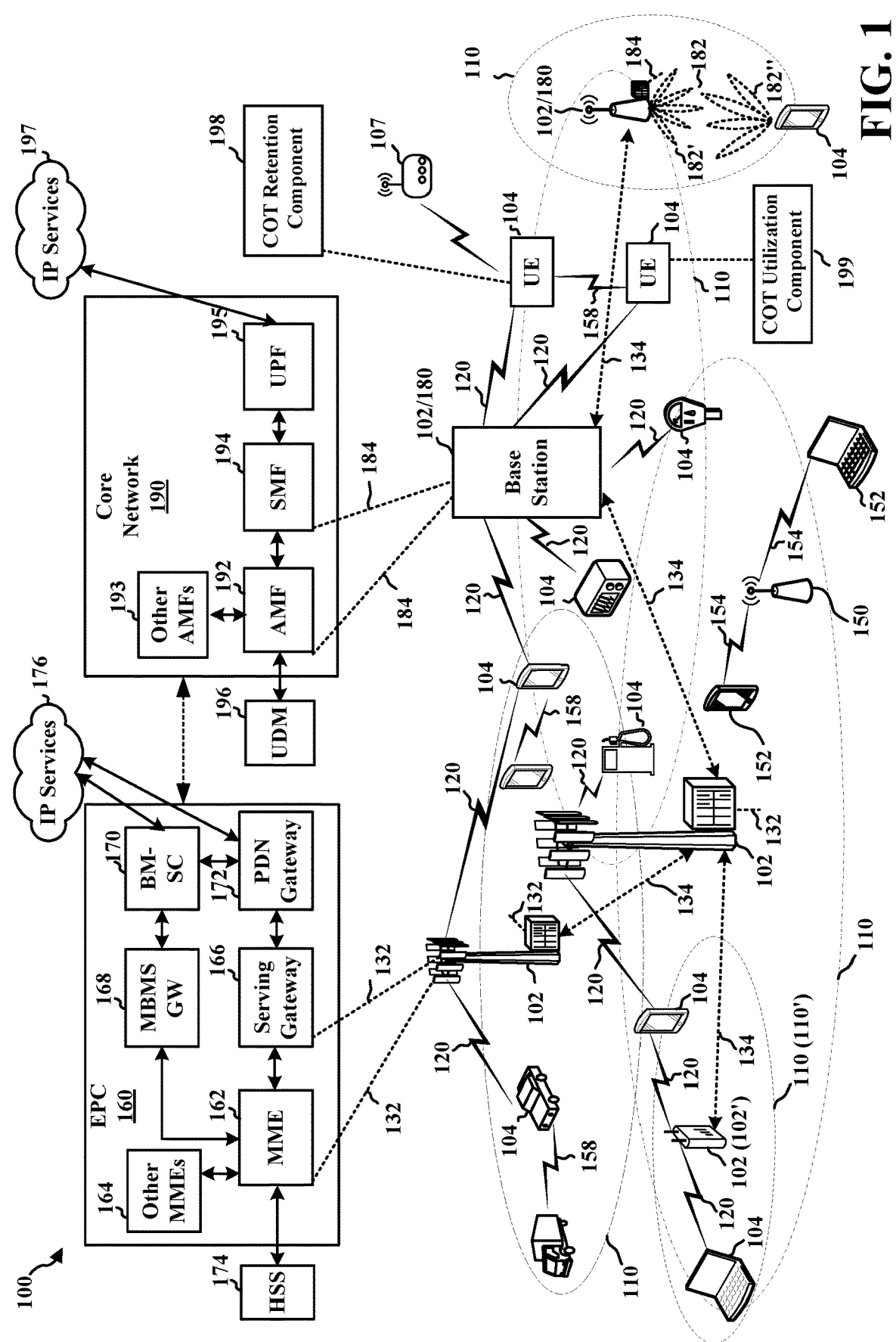
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104 (e.g., a first UE) or other device communicating based on sidelink, may include a channel occupancy time (COT) retention component 198 configured to configure, during a COT for an initial transmission, one or more subsequent transmissions that follow the initial transmission, the one or more subsequent transmissions configured to prevent a release of the COT; transmitting the initial transmission including an indication of the COT and a time period for transmitting the one or more subsequent transmissions; and transmitting the one or more subsequent transmissions during the indicated time period.

Referring again to FIG. 1, in certain aspects, a UE 104 (e.g., second UE), or other device communicating based on sidelink, may include a COT utilization component 199 configured to receiving an indication of a COT configured by a first UE and a time period where a release of the COT is prevented by the first UE; preparing a packet for transmission during the time period where the release of the COT is prevented by the first UE; and transmitting the packet during the COT configured by the first UE following the time period where the release of the COT is prevented by the first UE.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
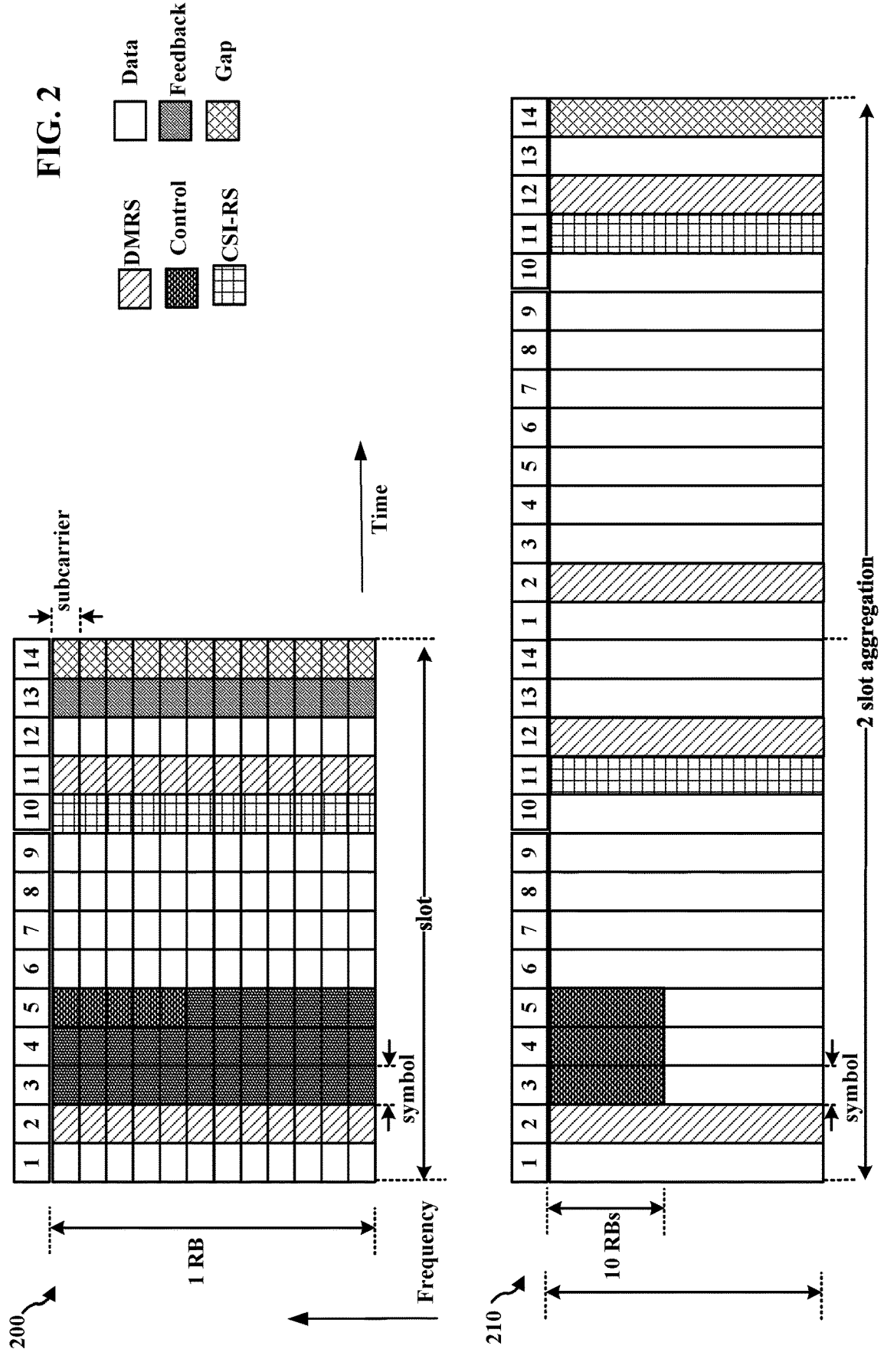
FIG. 2 illustrates example aspects of a sidelink slot structure.

FIG. 2 illustrates example diagrams 200 and 210 illustrating examples slot structures that may be used for sidelink communication (e.g., between UEs 104, RSU 107, etc.). The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information, e.g., along with demodulation RS (DMRS). FIG. 2 also illustrates that symbol(s) may include CSI-RS. The symbols in FIG. 2 that are indicated for DMRS or CSI-RS indicate that the symbol includes DMRS or CSI-RS REs. Such symbols may also include REs that include data. For example, if a number of ports for DMRS or CSI-RS is 1 and a comb-2 pattern is used for DMRS/CSI-RS, then half of the REs may include the RS and the other half of the REs may include data. A CSI-RS resource may start at any symbol of a slot, and may occupy 1, 2, or 4 symbols depending on a configured number of ports. CSI-RS can be periodic, semi-persistent, or aperiodic (e.g., based on control information triggering). For time/frequency tracking, CSI-RS may be either periodic or aperiodic. CSI-RS may be transmitted in bursts of two or four symbols that are spread across one or two slots. The control information may include Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may include the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
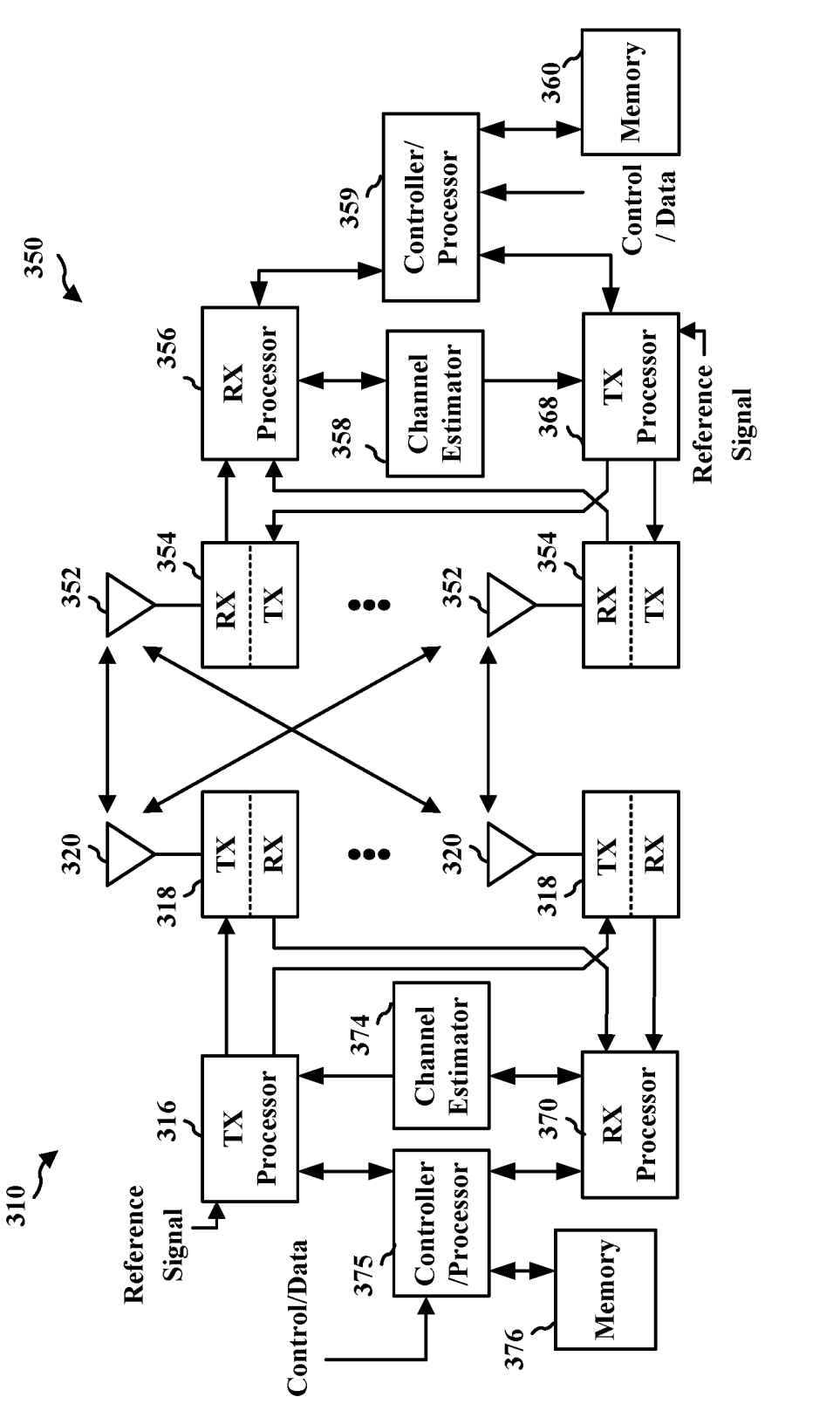
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the COT retention component 198 of FIG. 1.

At least one of the TX processor 368, the RX processor 356, and the controller/processor 359 may be configured to perform aspects in connection with the COT utilization component 199 of FIG. 1.

Figure 4:
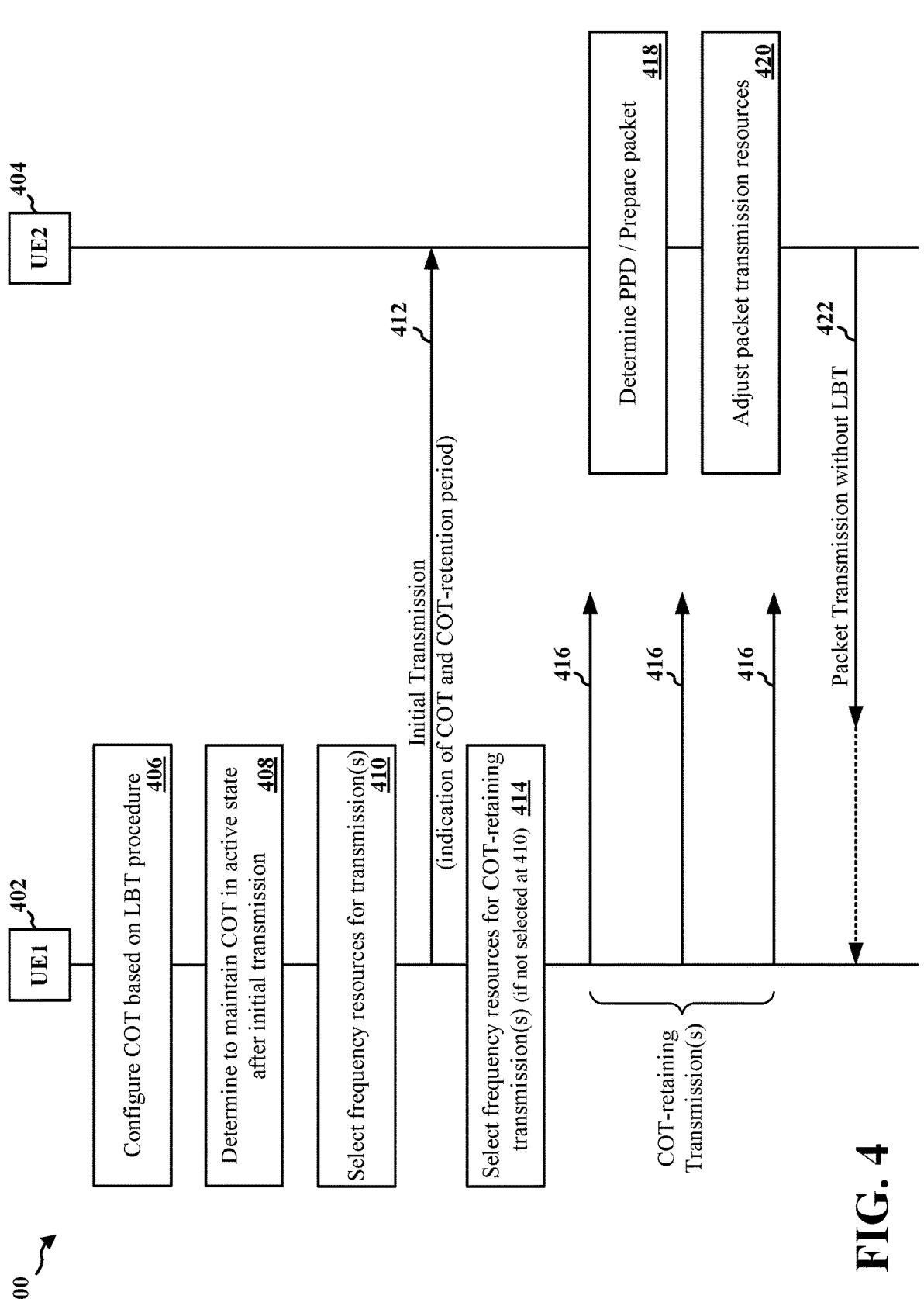
FIG. 4 is a call flow diagram illustrating communication between a first UE and a second UE.

FIG. 4 is a call flow diagram 400 illustrating communication between a first UE 402 and a second UE 404. At 406, the first UE 402 may configure a COT based on a listen-before-talk (LBT) procedure. The COT may be used by the first UE 402 and/or the second UE 404 to transmit signals in an unlicensed frequency brand. At 408, the first UE 402 may determine to maintain the COT in an active state after an initial transmission of the first UE 402 based on scheduling one or more COT-retaining transmissions 416 from the first UE 402. More specifically, if continuous transmission is not maintained within the COT after the initial transmissions, the COT configured by the first UE 402 may be released and a subsequent LBT procedure may have to be performed for transmitting subsequent transmissions. For example, after the COT is initiated by the first UE 402 and the initial transmission is performed by the first UE 402, the COT-retaining transmissions 416 may be transmitted in a manner that maintains a continuous utilization of the channel following the initial transmission to prevent the COT from being released.

At 410, the first UE 402 may select frequency resources for the transmissions of the first UE 402. For example, the first UE 402 may select frequency resources for the initial transmission of the first UE 402. If the first UE 402 determines, at 408, to maintain the COT in the active state before selecting, at 410, the frequency resources for the transmissions of the first UE 402, the first UE 402 may also select, at 410, the frequency resources for the one or more COT-retaining transmissions 416. Otherwise the frequency resources for the COT-retaining transmissions may be selected, at 414, after the initial transmission.

At 412, the first UE 402 may transmit the initial transmission, which may be received by the second UE 404. The initial transmission may include an indication of the COT configured, at 406, by the first UE 402 and an indication of a COT-retention period corresponding to a transmission length of the COT-retaining transmissions 416. If the first UE 402 determines to maintain the COT in the active state after transmitting the initial transmission, at 412, the first UE 402 may select the frequency resources for the COT-retaining transmission 416, at 414, as the frequency resource for the COT-retaining transmission 416 may not have been selected, at 410, by the first UE 402.

At 418, the second UE 404 may determine a packet preparation delay (PPD) of the second UE 404. That is, the second UE 404 may determine a non-zero time period for the second UE 404 to prepare a packet for transmission. If the second UE 404 determines that the PPD of the second UE 404 is less than or equal to the COT-retention period of the first UE 402, the second UE 404 may prepare the packet, at 418, during the COT-retaining transmissions 416 transmitted by the first UE 402. The second UE 404 may also adjust, at 420, packet transmission resources during the COT-retention period of the first UE 402. After the COT-retention period of the first UE 402 concludes, the second UE 404 may maintain the continuous transmission of the COT via a packet transmission, at 422, without performing the LBT procedure, as the first UE 402 already performed the LBT procedure to configure the COT. The packet transmitted, at 422, may be received by the first UE 402 or by a different UE.

Figure 5:
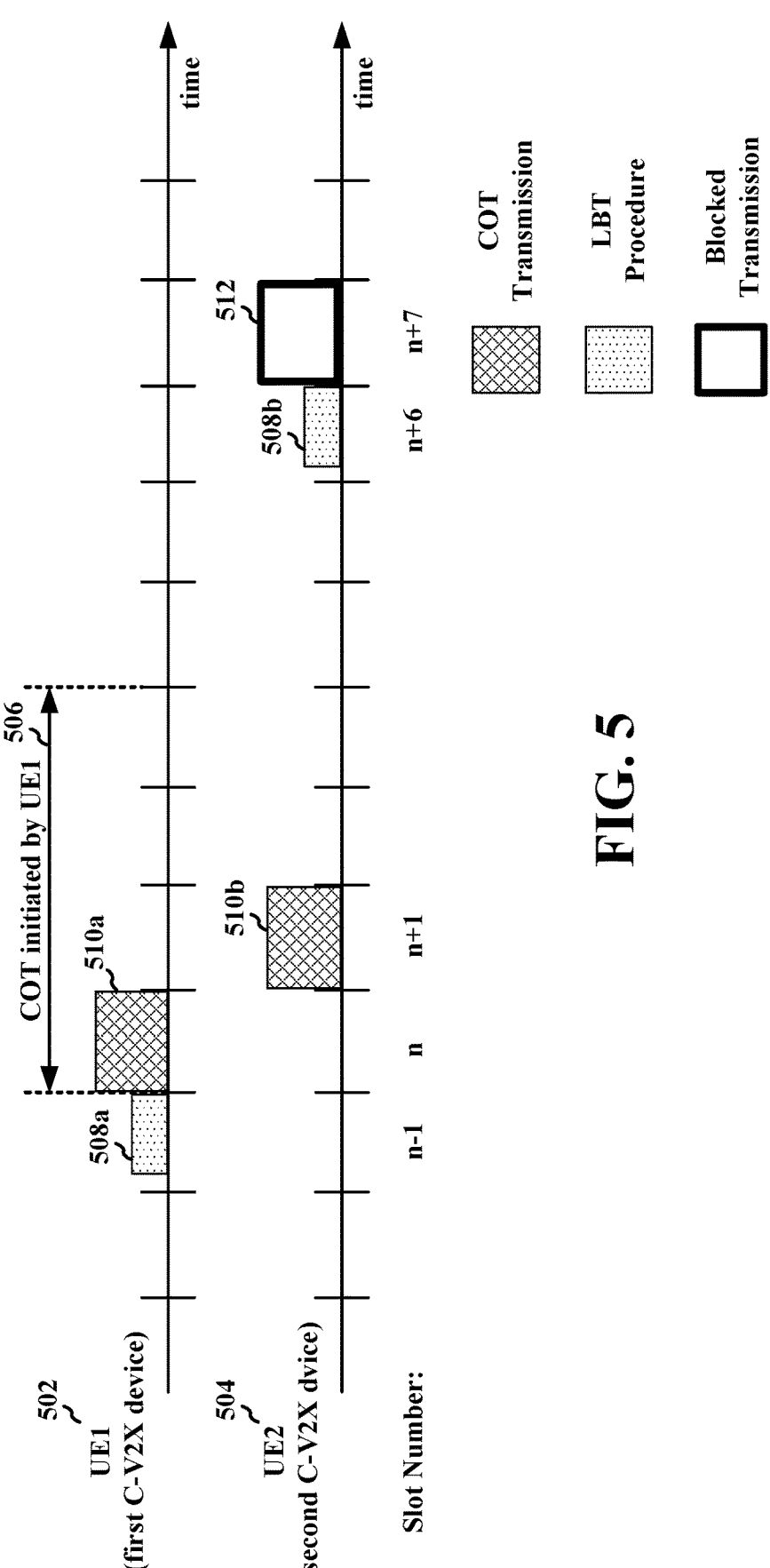
FIG. 5 illustrates an example timeline for transmissions of a first UE and a second UE during a channel occupancy time (COT).

FIG. 5 illustrates an example timeline 500 for transmissions 510a-510b of a first UE 502 and a second UE 504 during a COT 506. For an unlicensed frequency spectrum, an LBT procedure 508a may be performed prior to an initial transmission 510a, such as a C-V2X transmission. For example, the first UE 502 associated with a first C-V2X transmission may determine whether a channel is idle by listening for channel activity and, if the channel is determined to be idle, the first UE 502 may perform a transmission 510a in the unlicensed frequency spectrum.

Figure 6:
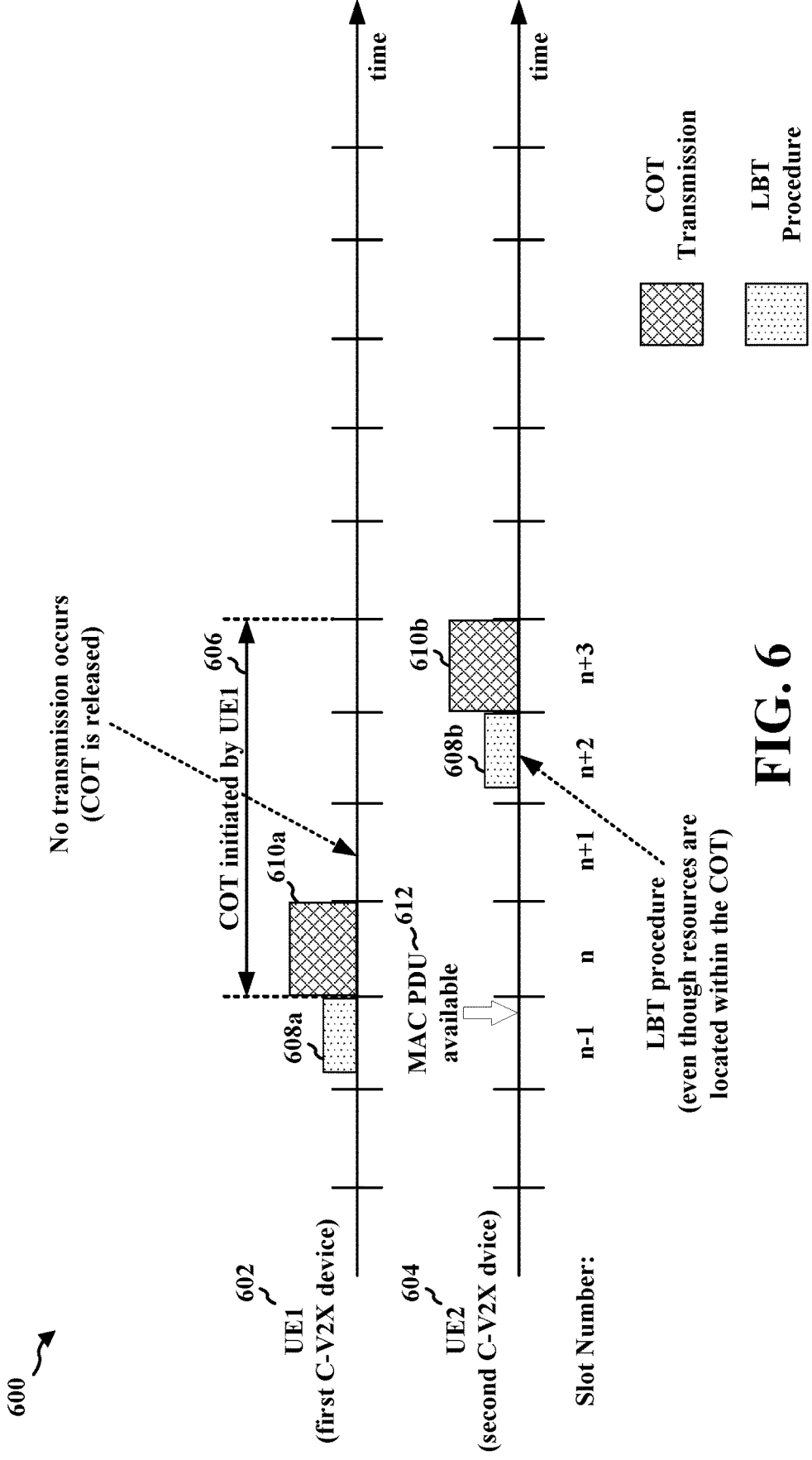
FIG. 6 illustrates an example timeline for transmissions of a first UE and a second UE during a COT.

In cases where the COT 506 is initiated by the first UE 502, a second UE 504 may be configured to utilize the COT 506 initiated by the first UE 502 to avoid executing the LBT procedure 508a and perform a transmission 510b in the unlicensed frequency spectrum. Thus, a performance of the second UE 504 may be increased via resource selection and transmission scheduling by the second UE 504 determined based on the COT 506 initiated by the first UE 502. While adaptive resource selection and transmission scheduling within an active COT 506 may increase the performance of the second UE 504, a time expended by the second UE 504 to prepare a packet for a PHY transmission may be greater than a duration of a single slot, which may result in a transmission gap between an end of the transmission 510a of the first UE 502 and a start of the transmission 510b of the second UE 504 that causes the COT 506 to be released (e.g., as illustrated in FIG. 6). Accordingly, if the second UE 504 determines that the COT 506 initiated by the first UE 502 is active up through slot n, the transmission 510b of the second UE 504 may need to be scheduled for slot n+1 or the COT 506 may be released at slot n+1, if slot n+1 does not include other transmission activity. The gap in transmission activity at slot n+1 may further prevent slot n+2 and subsequent slots of the COT 506 from being utilized based on the COT 506 being released at slot n+1.

The COT 506 initiated by the first UE 502 may be released if the COT 506 is not continuously utilized via transmissions 510a-510b over the slots associated with the COT 506. Since there may be no guarantee that the COT 506 initiated by the first UE 502 will remain active for slot n+2, a COT-sharing opportunity may be lost for the second UE 504, if a time for the second UE 504 to prepare the packet for transmission prevents the second UE 504 from transmitting the packet prior to slot n+2. A COT-sharing technique that allows for a non-zero PPD may enable the second UE 504 to adaptively select/reselect transmission resources (e.g., for unlicensed C-V2X transmissions) based on the COT 506 initiated by the first UE 502. The COT-sharing technique may include assurances to the second UE 504 that the COT 506 will remain active during the packet preparation time of the second UE 504. Such techniques may increase channel access efficiency for C-V2X devices based on a reduction in the number of instances where the LBT procedure 508a-508b is performed.

The COT 506 may correspond to a time period for which the first UE 502 and/or the second UE 504 is allowed to transmit after the LBT procedure 508a is performed and the channel is determined by the first UE 502 to be idle. In further aspects, a number of UEs may be configured to utilize the COT 506 initiated by the first UE 502 provided that utilization of the COT 506 corresponds to continuous transmissions of the UEs. For example, one or more transmissions 510a-510b of the first UE 502 and/or the second UE 504 may occur up to a full duration of the COT 506, which may be determined based on a predefined protocol. For example, the duration of the COT 506 may range from 2-10 ms, which may correspond to 4-20 slots in C-V2X configurations having a 30 kHz subcarrier spacing (SCS). Individual transmissions of the one or more transmissions 510a-510b may be 0.5 ms in duration (e.g., one slot) and may be associated with a periodic traffic pattern.

By implementing COT-sharing techniques, a single LBT procedure 508a may be executed by the first UE 502 to enable the one or more transmissions 510a-510b to be performed by the first UE 502 and the second UE 504. The one or more transmissions 510a-510b may occur over a plurality of consecutive slots (e.g., slot n and slot n+1). Thus, if the first UE 502 determines to transmit over a selected slot (e.g., slot n) that is not included in a currently active/shared COT, the first UE 502 may perform the LBT procedure 508a (e.g., at slot n−1) prior to a start of the slot (e.g., slot n). If the first UE 502 determines based on the LBT procedure 508a that the channel is idle, the first UE 502 may initiate the COT 506 and perform one or more transmissions 510a during the COT 506. If another UE (e.g., the second UE 504) in proximity to the first UE 502 that initiated the COT 506 receives an indication of the COT 506, the other UE may transmit in slots (e.g., n+1, n+2, n+3, etc.) of the COT 506 based on skipping the LBT procedure 508a altogether or by performing a category-2 (cat-2) or Type 2 LBT procedure.

The first UE 502 that initiated the COT 506 may transmit an indication via SCI of a maximum time period over which the COT 506 initiated by the first UE 502 may remain active as a result of continuous transmission activity, so that other UEs, such as the second UE 504, that receive the indication may determine whether to utilize one or more slots of the COT 506 based on a packet preparation time of the other UEs. The indication included in the SCI may further indicate a time period for which the first UE 502 is guaranteeing that the COT 506 will remain active based on one or more COT-retention transmissions of the first UE 502 that follow the initial transmission 510a.

A C-V2X device may receive and decode the SCI in a control channel to identify the COT 506 and determine whether an upcoming transmission of the C-V2X device is covered by the COT 506. For example, the C-V2X device may determine whether a maximum duration of the COT 506 includes the slot for the upcoming transmission of the C-V2X device and whether the first UE 502 is guaranteeing that the COT 506 will remain active for the slot of the upcoming transmission of the C-V2X device. If so, the C-V2X device may skip the LBT procedure 508a and utilize the COT 506. In aspects, the second UE 504 that utilizes the COT 506 initiated by the first UE 502 may further propagate/transmit SCI indicative of the COT 506 for further UEs to receive and determine whether an upcoming transmission of the further UEs is covered by the COT 506. Transmission of COT information may be repeated via SCI for each transmission 510a-510b that occurs within the COT 506 by any of the UEs.

In the timeline 500, the first UE 502 (e.g., first C-V2X device) may determine to transmit over slot n. Prior to performing the transmission over slot n, the first UE 502 may perform the LBT procedure 508a at slot n−1 if the first UE 502 has not received an indication of an active COT that includes slot n. Thus, the COT 506 that includes slot n may be initiated by the first UE 502 via the LBT procedure 508a performed in slot n−1. The first UE 502 may determine that the channel is idle based on the LBT procedure 508a and transmit over slot n after the COT 506 is initiated. In the timeline 500, a duration of the COT 506 may correspond to 4 slots. However, in other configurations, the duration of the COT 506 may include up to 20 or more slots. The transmission 510a in slot n may indicate via the SCI that the COT 506 has been initiated by the first UE 502 and that the COT 506 is based on a total duration of 4 slots. The second UE 504 (e.g., second C-V2X device) in proximity to the first UE 502 may receive the transmission 510a from the first UE 502 and decode the COT information from the SCI to determine that the COT 506 initiated at slot n by the first UE 502 will be active for a total of 4 slots.

If the second UE 504 has previously selected a resource for performing a transmission in slot n+1 and receives the indication of the COT 506 initiated by the first UE 502 prior to slot n+1, the second UE 504 may transmit a packet over slot n+1 without performing the LBT procedure 508a. Alternatively, the second UE 504 may perform a cat-2/Type 2 LBT procedure (e.g., a "light" LBT procedure) prior to transmitting the packet at slot n+1. Cat-2/Type 2 LBT procedures may be associated with an increased COT initiation success rate over cat-4 LBT procedures (e.g., "full" LBT procedures). For the resource selected in slot n+7 of the timeline 500, the second UE 504 may perform the full LBT procedure 508b (e.g., in slot n+6), since the second UE 504 has not received an indication of an active COT that includes slot n+7. The LBT procedure 508b may be aborted if the sensed channel is determined to be busy, which may result in a blocked/failed transmission 512 based on the second UE 504 being unable to initiate a COT that includes slot n+7.

In examples, other UEs (e.g., a third UE, a fourth UE, etc.) that receive the indication of the COT 506 initiated by the first UE 502 may utilize subsequent slots (e.g., slot n+1, slot n+2, slot n+3, etc.) of the COT 506 in a similar manner to the second UE 504 without performing the LBT procedure 508a. That is, slot n+1 and/or subsequent slots of the COT 506 may be utilized by the third UE, the fourth UE, etc., whereas slot n of the COT 506 may be utilized by a single UE (e.g., the first UE 502) that initiated the COT 506, since the COT 506 has to be indicated to other UEs via the initial transmission 510a before the other UEs may determine an existence and availability of the COT 506. Multiple UEs may be configured to utilize a same slot when transmissions occupy different subchannels of the same slot and do not collide. A C-V2X resource selection procedure may be configured to provide multi-UE use of the same slot.

When a MAC data unit is available for PHY transmission, the signal to be transmitted (e.g., in-phase and quadrature (IQ) samples) may be generated based on a plurality of operations. For example, the PHY layer may be associated with encoding of the MAC data unit and rate matching to the PSSCH resources; encoding of the SCI information to be transmitted over the PSCCH resources; and generating the DMRS symbols transmitted over the PSSCH and PSCCH resources. Such procedures may correspond to a non-zero PPD, which may be dependent upon UE-implementations. That is, the PPD for the first UE 502 may be different from the PPD for the second UE 504. Thus, a UE may experience a PPD of one or more C-V2X slots.

If the COT 506 does not include continuous transmissions after the COT 506 is initiated, the COT 506 may be released such that an LBT procedure (e.g., 508b) may have to be performed to initiate another COT for one or more subsequent transmissions (e.g., 512). In order to retain a shared COT, the first UE 502 and the second UE 504 that utilize the shared COT 506 may transmit (e.g., at 510a-510b) in a manner that prevents idle C-V2X slots from occurring within the COT 506. Thus, the second UE 504 may determine that the shared COT 506 is active over a slot (e.g., slot n) and schedule a transmission over slot n+1 to maintain continuous transmission in the COT 506, as there may be no guarantee that the first UE 502 that initiated the COT 506, or some other UE that determined the existence of the COT 506, will transmit over slot n+1 to retain the COT 506 for a transmission over slot n+2. Some C-V2X transmissions may have a duration that corresponds to a single slot such that the transmission 510*a* that initiated the COT 506 may also have a duration that corresponds to the single slot. Based on such criteria, COT-sharing may be limited to instances where the second UE 504 happens to have a previously selected resource for slot n+1 and has already prepared the packet for transmission prior to determining that the shared COT 506 is active over slot n and available for transmission over slot n+1.

Performance may be increased based on adjusting a resource selection to be located within an active COT. In examples, the transmission 510*a* associated with the generated COT 506 may be configured to trigger the resource reselection based on an indication of the COT 506 and an indication of an active duration of the COT 506. If the MAC transmits the data unit while the COT 506 is active, an initial transmission 510*a* may be scheduled within the active COT 506. The second UE 504 may determine to reschedule a future transmission/retransmission (e.g., 510*b*) at an earlier time/slot in order for the future transmission/retransmission (e.g., 510*b*) to be included in the active COT 506 that the second UE 504 may have been unable to determine at the time the second UE 504 initially selected the resources for the transmission/retransmission.

Adjusting selected resources to a newly identified COT 506 may cause the second UE 504 to prepare the packet for transmission within a time interval that is less than a C-V2X slot (e.g., 0.5 ms for 30 kHz SCS). For example, the second UE 504 may have to prepare the packet for transmission during a time interval of slot n in order to transmit the packet in the immediately subsequent slot (e.g., slot n+1). However, some UEs may utilize more than one slot to prepare the packet for transmission. Even if PSSCH IQ samples are available (e.g., from a previous transmission), a non-zero PPD may occur for the retransmission of the packet if the SCI and DMRS depend on a frame/slot index. If the PPD is greater than a duration of the slot, no transmission may occur over the slot (e.g., slot n+1) and the COT 506 may be released. Thus, COT-sharing techniques may be implemented if the second UE 504 that utilizes the COT 506 is provided assurances that the COT 506 will remain active over a PPD interval, so that the second UE 504 may skip the LBT procedure 508*a* if the second UE 504 is able to transmit within the COT 506.

FIG. 6 illustrates an example timeline 600 for transmissions 610*a*-610*b* of a first UE 602 and a second UE 604 during a COT 606. The second UE 604 (e.g., the second C-V2X device) may not utilize the COT 606 initiated by the first UE 602 (e.g., the first C-V2X device) based on the LBT procedure 608*a*, as the transmission 610*b* of the second UE 604 at slot n+3 does not maintain continuous transmissions with the transmission 610*a* of the first UE 602 at slot n. The non-continuous transmission may be based on a non-zero PPD for the transmission 610*b* of the second UE 604 corresponding to an availability of a MAC packet data unit (PDU) 612 occurring prior to a start of slot n.

The second UE 604 may receive, near an end of slot n−1, the MAC PDU 612 for transmission. However, the first UE 602 may initiate the COT 606 at slot n, which the second UE 604 may determine by decoding the SCI of the COT-initiating transmission 610*a*. Due to the non-zero PPD, the second UE 604 may not have enough time to prepare a packet for transmission prior to slot n+3. While slot n+3 is within the COT 606 initiated by the first UE 602, there may be no guarantee that slot n+1 and slot n+2 will include transmissions that maintain the COT 606 in an active state.

If the COT 606 is not maintained in the active state, the second UE 604 may perform the LBT procedure 608*b*, which may or may not result in a blocked/failed transmission of the second UE 604.

Figure 7:
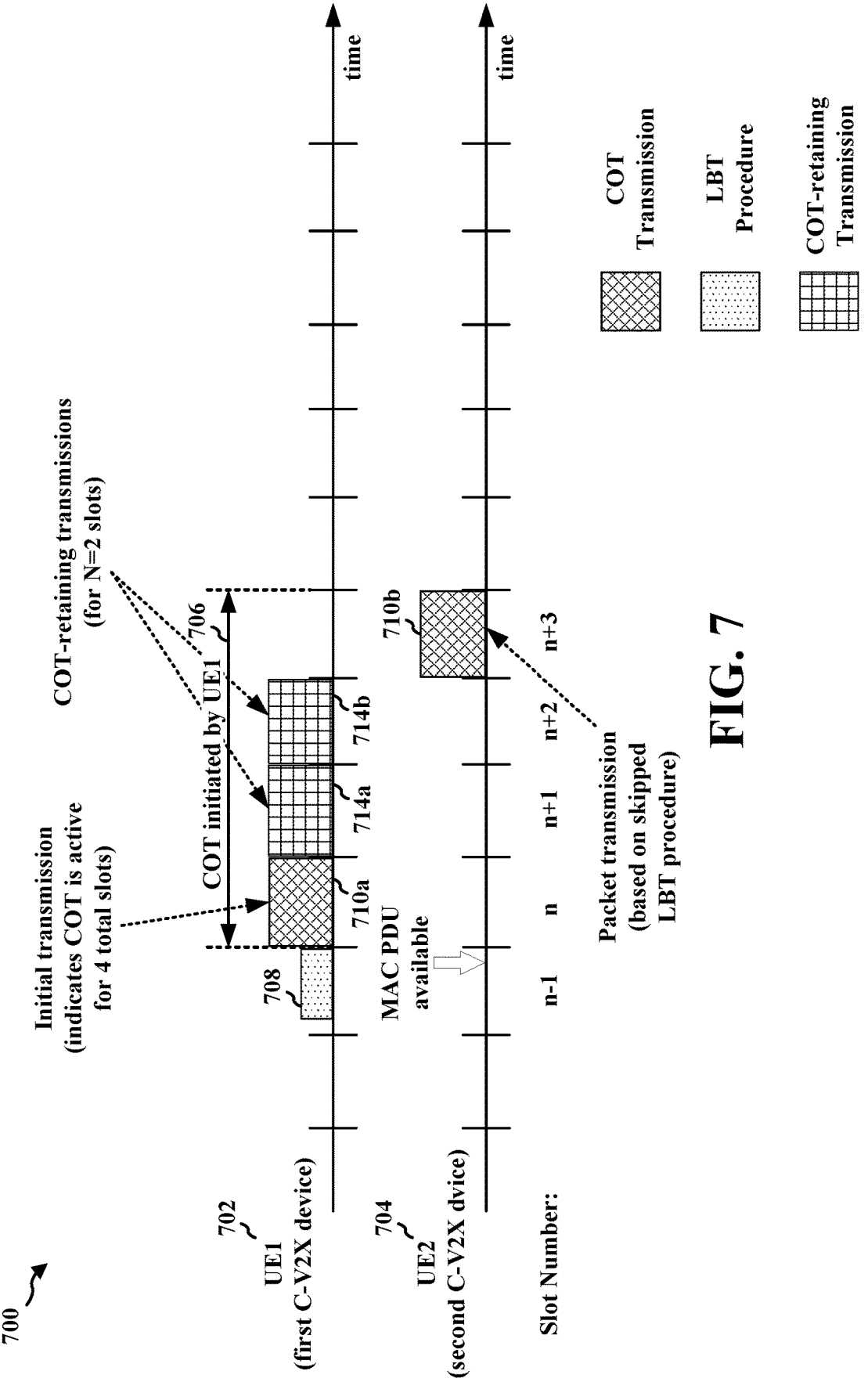
FIG. 7 illustrates an example timeline for transmissions of a first UE and a second UE during a COT.

FIG. 7 illustrates an example timeline 700 for transmissions 710*a*-710*b*/714*a*-714*b* of a first UE 702 and a second UE 704 during a COT 706. When the first UE 702 initiates the COT 706, the first UE 702 may be configured to transmit one or more subsequent transmissions 714*a*-714*b* in N subsequent slots that follow an initial transmission 710*a*. For example, the first UE 702 may indicate, via an SCI transmission, a shared-COT 706 initiated at slot n. The SCI transmission may indicate that the first UE 702 will continue transmitting over slots n+1, n+2, . . . , n+N. In other configurations, the duration of the COT 706 may not be long enough to include a slot n+N. If the additional N transmissions 714*a*-714*b* that follow the initial transmission 710*a* cover a long enough duration for the non-zero PPD of the second UE 704, the second UE 704 may be provided assurances that the second UE 704 has enough time to prepare a packet for transmission without the COT 706 being released, so that the second UE 704 may transmit the packet without performing (e.g., skipping) the LBT procedure 708 after having spent the time to prepare the packet.

A total number of the additional N transmissions 714*a*-714*b* that follow the initial transmission 710*a* may be selected based on a corresponding PPD of the second UE 704 that may attempt to utilize the COT 706 initiated by the first UE 702. For example, if the PPD corresponds to a duration of three slots and the first slot is used for the initial transmission 710*a* by the first UE 702, N may be equal to 2, so that an otherwise non-continuous transmission gap in the COT 706 between the initial transmission 710*a* of the first UE 702 and the transmission 710*b* of the second UE 704 is filled with continuous transmissions (e.g., 714*a*-714*b*) by the first UE 702.

Increasing the value of N beyond the PPD of the second UE 704 may generate congestion. However, since different UEs may have different PPDs, and therefore may correspond to different minimum values of N, a fixed value for N may not provide optimal results in all cases. Nevertheless, the value of N may be a preconfigured system-wide value or a value that is determined and provided to the first UE 702 by the network. In further configurations, the first UE 702 that initiates the COT 706 may independently determine the value of N or the first UE 702 may determine the value of N based on characteristics of the second UE 704 that may utilize the shared-COT 706. For example, if the first UE 702 determines that load conditions are increased (e.g., based on a channel busy ratio (CBR) measurement), the first UE 702 may determine to set N=0 and not perform COT-retention techniques, as there may be an increased likelihood that the COT 706 initiated by the first UE 702 will be retained by a prescheduled transmission of another UE. In some cases, the COT 706 may be retained by prescheduled transmissions of multiple UEs.

A transmission 710*a*/714*a*-714*b* by the first UE 702 may be utilized to retain the COT 706 in an active state, even if the transmission 714*a*-714*b* corresponds to noise. However, COT-retaining transmissions 714*a*-714*b* that repeat the initial transmission 710*a* of the first slot may serve as "blind" retransmissions, which may improve a success rate for decoding the initial transmission 710*a*. For example, a receiver may be configured to listen for the COT-retaining transmissions 714*a*-714*b* to receive information that may otherwise be associated with a single slot. While such "soft" retransmissions may not be counted as "true" retransmissions, the soft retransmissions may provide an added benefit to COT-retention schemes. That is, while a certain number of true retransmissions may be triggered based on feedback, soft retransmissions (e.g., COT retaining signals 714a-714b) are transmissions that may not be counted toward a maximum number of allowed true retransmissions.

True retransmissions may be associated with multiple back-to-back retransmissions, whereas a soft retransmission may not be followed by a subsequent retransmission of the soft retransmission. The soft retransmissions may be configured to re-indicate the presence and duration of the COT 706 indicated via the initial transmission 710a. Further, the soft retransmissions may not carry COT information, otherwise the soft retransmissions may have to be followed by a subsequent retransmission of the soft retransmission, which may cause a continuous utilization of the medium and an unnecessary increase in congestion. Thus, if the second UE 704 attempts to decode the soft retransmission, but fails to decode the initial transmission 710a corresponding to the initiation of the COT 706, the second UE 704 may not determine the presence and duration of the COT 706.

By reserving frequency resources for the COT-retaining slots and the sub-channels that the COT-retaining transmissions 714a-714b will occupy, such resources may be excluded from potential use by other UEs for other transmissions. For example, the frequency resources (e.g., sub-channels) of the COT-retaining slots may be the same frequency resources as used for the slot of the initial transmission 710a, as long as no other device has previously reserved the frequency resources for the time that the COT-retraining transmissions 714a-714b are transmitted (e.g., a reservation of future resources may be used for C-V2X techniques). In cases where N is greater than or equal to 2, the same sub-channels may not be used for all of the COT-retaining transmissions 714a-714b, if such resources are reserved by other devices. However, if the same resources are not reserved by other devices, the same sub-channels may be used for the initial transmission 710a and the COT-retaining transmissions 714a-714b.

If the sub-channel that carries the initial transmission 710a (e.g., COT-indicating transmission) has been reserved in any of the subsequent COT-retaining slots by one or more other UEs, the first UE 702 may skip such slots and transmit COT-retaining signals over the remaining unreserved slots, as the COT 706 may be retained in the active state via the one or more transmissions on the reserved resources by the one or more other UEs. Thus, the COT 706 may be retained in a cooperative manner by relying on the one or more other UEs that reserved the resources to transmit on such resources for retaining the COT 706. Alternatively, if the sub-channel of the initial transmission 710a (e.g., COT-indicating transmission) has been reserved in any of the subsequent COT-retaining slots, the first UE 702 may select different non-overlapping resources for the slots. Thus, the COT-retaining slots may be associated with different sub-channels than the COT-indicating slot. If a common set of sub-channels is identified over all the COT-retaining slots, the common set of sub-channels may be utilized for the transmissions.

The first UE 702 that performs the COT-retaining transmissions 714a-714b may indicate the resources to be utilized for such transmissions to the network, so that other UEs may receive the indication of the resources and select different resources for performing transmissions of the other UEs. The indication to the network may be signaled via the SCI of the initial transmission 710a. That is, the COT-indicating transmission may indicate that the transmission will be followed by N COT-retaining transmissions 714a-714b. The COT-indicating transmission may also indicate the sub-channels where the N COT-retaining transmissions 714a-714b will occur. If the first UE 702 determines prior to the COT-initiating transmission that the COT-retaining transmissions 714a-714b will be performed, the first UE 702 may reserve the resources for the COT-retaining transmissions 714a-714b at a time that the resources of the COT-initiating transmission are reserved. Techniques that reduce signaling overhead (e.g., transmitting over the same sub-channel for the COT-retaining slots) may be performed over techniques associated with increased signaling overhead. In examples, the first UE 702 may indicate the number of COT-retaining slots (e.g., N) and/or that the sub-channels to be used for the COT-retaining slots are the same sub-channels as used for the COT-indicating transmission.

The shared-COT 706 may be propagated by additional UEs that determine to utilize the COT 706 via the SCI of the additional UEs. If the shared-COT 706 is propagated by the additional UEs that utilize the shared-COT 706, configuring each of the additional UEs to transmit over N consecutive slots may cause increased congestion. Thus, COT-retaining transmissions 714a-714b may be limited to the first UE 702 that performed the LBT procedure 708 and initiated the COT 706, as other UEs may determine the presence of the COT 706 based on the COT-initiating transmission from the first UE 702. In further examples, COT-propagating UEs may perform COT-retaining transmissions based on predetermined criteria. For instance, COT-retaining transmissions of other UEs that utilize the COT 706 in the 2nd, 3rd, . . . , Nth slot of the COT 706, but not later, where N is greater than or equal to 2, may be pre-configured or determined by the network. Another approach that may be used to reduce congestion may be to restrict COT-retaining techniques to certain type of transmissions. For example, COT-retaining techniques may be utilized if the transmission of the packet is not a retransmission of the packet. In another example, COT-retaining techniques may be utilized for transmissions associated with unicast links, group cast, etc. Activation/deactivation of the COT-retaining techniques may be adapted based on the congestion of the network, which may be determined via CBR measurements.

FIG. 8 is a flowchart 800 of a method of wireless communication. The method may be performed by a first UE (e.g., the UE 104, 402, 502, 602, 702; the apparatus 1002; etc.), which may include the memory 360 and which may be the entire UE 104, 402, 502, 602, 702 or a component of the UE 104, 402, 502, 602, 702, such as the TX processor 368, the RX processor 356, and/or the controller/processor 359.

At 802, the UE may configure, during the COT for an initial transmission, one or more subsequent transmissions that follow the initial transmission, the one or more subsequent transmissions configured to prevent a release of the COT. For example, referring to FIGS. 4 and 7, the UE 702 may determine to transmit, during the COT 706, COT-retaining transmissions 714a-714b following the initial transmission 710a to prevent the COT 706 from being released. Further, the first UE 402 may determine, at 408, to maintain the COT in an active state after the initial transmission is performed. The configuration, at 802, may be performed by the configuration component 1240 of the apparatus 1202 in FIG. 12.

At 804, the UE may transmit the initial transmission including an indication of the COT and the time period for transmitting the one or more subsequent transmissions. For example, referring to FIGS. 4 and 7, the first UE 402 may transmit, at 412, the initial transmission to the second UE 404 including an indication of the COT and a COT-retention period. Similarly, the first UE 702 may transmit the initial transmission 710a including an indication that the COT 706 will be active for four total slots. The transmission, at 804, may be performed by the transmission component 1234 of the apparatus 1202 in FIG. 12.

At 806, the UE may transmit the one or more subsequent transmissions during the indicated time period. For example, referring to FIGS. 4 and 7, the first UE 402 may transmit the COT-retaining transmission(s) 416 during the COT-retention period indicated via the initial transmission, at 412. Similarly, the first UE 702 may transmit the COT-retaining transmissions 714a-714b based on the indication included in the initial transmission 710a. The transmission, at 806, may be performed by the transmission component 1234 of the apparatus 1202 in FIG. 12.

FIG. 9 is a flowchart 900 of a method of wireless communication. The method may be performed by a first UE (e.g., the UE 104, 402, 502, 602, 702; the apparatus 1002; etc.), which may include the memory 360 and which may be the entire UE 104, 402, 502, 602, 702 or a component of the UE 104, 402, 502, 602, 702, such as the TX processor 368, the RX processor 356, and/or the controller/processor 359.

At 902, the UE may configure a COT based on a LBT procedure. For example, referring to FIGS. 4-7, the first UE 402 may configure, at 406, the COT based on the LBT procedure. In aspects, the configured COT may correspond to the COT 506/606/706 initiated by the first UE 502/602/ 702. The configuration, at 902, may be performed by the configuration component 1240 of the apparatus 1202 in FIG. 12.

At 904, the UE may configure or determine to transmit, during the COT for an initial transmission, one or more subsequent transmissions that follow the initial transmission, the one or more subsequent transmissions configured to prevent a release of the COT. For example, referring to FIGS. 4 and 7, the UE 702 may configure or determine to transmit, during the COT 706, COT-retaining transmissions 714a-714b following the initial transmission 710a to prevent the COT 706 from being released. Further, the first UE 402 may determine, at 408, to maintain the COT in an active state after the initial transmission is performed. A time period where the release of the COT 706 is prevented may be equal to a sum of a time period for transmitting the initial transmission 710a (e.g., a time period of slot n) and the time period for transmitting the one or more subsequent transmissions 714a-714b (e.g., a time period of slots n+1 and n+2). A time period for the COT 706 may be two or more slots (e.g., slot n through slot n+3), the time period for transmitting the initial transmission 710a being at least one slot (e.g., slot n), and the time period for transmitting the one or more subsequent transmissions 714a-714b being one or more slots (e.g., slot n+1 and slot n+2). The configuration, at 904, may be performed by the configuration component 1240 of the apparatus 1202 in FIG. 12.

In a first aspect, the determination (e.g., at 408) to transmit the one or more subsequent transmissions (e.g., COT-retaining transmission(s) 416) may be based on fulfilling a condition for sharing the COT with a second UE 404. In a second aspect, the determination (e.g., at 408) to transmit the one or more subsequent transmissions (e.g., COT-retaining transmission(s) 416) may be based on a type of the initial transmission 412. In a third aspect, the determination (e.g., at 408) to transmit the one or more subsequent transmissions (e.g., COT-retaining transmission(s) 416) may be based on a congestion level of a network. In a fourth aspect, the initial transmission 412 may be configured to initiate the COT, where the determination (e.g., at 408) to transmit the one or more subsequent transmissions (e.g., COT-retaining transmission(s) 416) may be based on the initial transmission 412 initiating the COT.

At 906, the UE may determine (e.g., calculate) a time period for transmitting the one or more subsequent transmissions based on at least one of an independent UE procedure, a configuration by a network or a base station, or a predefined protocol. For example, referring to FIG. 4, the first UE 402 may determine, at 408, to maintain the COT in an active state after transmitting the initial transmission, at 412, via a time period for performing the COT-retaining transmission(s) 416. The determination, at 906, may be performed by the determination component 1242 of the apparatus 1202 in FIG. 12.

At 908, the UE may select one or more frequency resources for the one or more subsequent transmissions prior to transmitting the initial transmission. For example, referring to FIG. 4, the first UE 402 may select, at 410, frequency resources for transmission(s) prior to transmitting, at 412, the initial transmission to the second UE 404. The one or more frequency resources selected (e.g., at 410 or 414) for the one or more subsequent transmissions (e.g., COT-retaining transmission(s) 416) may be identical to one or more frequency resources selected (e.g., at 410) for the initial transmission transmitted, at 412, to the second UE 404. The selection, at 908, may be performed by the selection component 1244 of the apparatus 1202 in FIG. 12.

At 910, the UE may transmit the initial transmission including an indication of the COT and the time period for transmitting the one or more subsequent transmissions. For example, referring to FIGS. 4 and 7, the first UE 402 may transmit, at 412, the initial transmission to the second UE 404 including an indication of the COT and a COT-retention period. Similarly, the first UE 702 may transmit the initial transmission 710a including an indication that the COT 706 will be active for four total slots. The COT 706 and the time period for transmitting the one or more subsequent transmissions (e.g., COT-retraining transmissions 416/714a-714b) may be indicated via SCI. The transmission, at 910, may be performed by the transmission component 1234 of the apparatus 1202 in FIG. 12.

At 912, the UE may determine whether one or more frequency resources selected for transmitting the initial transmission are available for transmitting the one or more subsequent transmissions, the one or more subsequent transmissions being transmitted during the indicated time period on the one or more frequency resources selected for transmitting the initial transmission when the one or more frequency resources selected for transmitting the initial transmission are available. For example, referring to FIG. 4, the first UE 402 may select, at 414, frequency resources for COT-retaining transmission(s) 416, if the frequency resources for the COT-retaining transmission(s) 416 were not selected, at 410, by the first UE. The selection, at 414, of resources for the COT-retraining transmission(s) 416 may be identical to the selection, at 410, of resources for the initial transmission 412, if identical resources are available, such that the COT-retaining transmission(s) 416 may be transmitted by the first UE 402 on the identical resources. The determination, at 912, may be performed by the determination component 1242 of the apparatus 1202 in FIG. 12.

At 914, the UE may transmit the one or more subsequent transmissions during the indicated time period. For example, referring to FIGS. 4 and 7, the first UE 402 may transmit the COT-retaining transmission(s) 416 during the COT-retention period indicated via the initial transmission, at 412.

Similarly, the first UE 702 may transmit the COT-retaining transmissions 714a-714b based on the indication included in the initial transmission 710a. The time period for transmitting the one or more subsequent transmissions (e.g., COT-retaining transmission(s) 416) may correspond to a packet preparation time (e.g., determined at 418) of a second UE 404. The one or more subsequent transmissions (e.g., COT-retaining transmission(s) 416) may include information that is duplicative of information included in the initial transmission (e.g., transmitted, at 412, by the first UE 402). The transmission, at 914, may be performed by the transmission component 1234 of the apparatus 1202 in FIG. 12.

FIG. 10 is a flowchart 1000 of a method of wireless communication. The method may be performed by a second UE (e.g., the UE 104, 404, 504, 604, 704; the apparatus 1102; etc.), which may include the memory 360 and which may be the entire UE 104, 404, 504, 604, 704 or a component of the UE 104, 404, 504, 604, 704, such as the TX processor 368, the RX processor 356, and/or the controller/processor 359.

At 1002, the UE may receive an indication of a COT configured by a first UE and a time period where a release of the COT is prevented by the first UE. For example, referring to FIGS. 4 and 7, the second UE 404 may receive an initial transmission, at 412, including an indication of a COT and a COT-retention period of the first UE 402. Similarly, the second UE 704 may receive an initial transmission 710a from the first UE 702 including an indication that the COT will be active for four total slots. The reception, at 1002, may be performed by the reception component 1330 of the apparatus 1302 in FIG. 13.

At 1004, the UE may prepare the packet for transmission during the time period where the release of the COT is prevented by the first UE. For example, referring to FIGS. 4 and 7, the second UE 404 may prepare the packet, at 418, during the COT-retention period corresponding to the COT-retaining transmission(s) 416. Similarly, the second UE 704 may prepare the packet in slot n+1 and/or slot n+2 for the packet transmission 710b at slot n+3. The preparing, at 1004, may be performed by the preparation component 1342 of the apparatus 1302 in FIG. 13.

At 1006, the UE may transmit the packet during the COT configured by the first UE following the time period where the release of the COT is prevented by the first UE. For example, referring to FIG. 7, the second UE 704 may perform the packet transmission 710b at slot n+3 during the COT 706 following the COT-retaining transmissions 714a-714b at slot n+1 and slot n+2. The transmission of the packet (e.g., at slot n+3) during the COT 706 may be performed without a LBT procedure of the second UE 704. For example, the transmission of the packet (e.g., at slot n+3) during the COT 706 may be performed based on a LBT procedure of the first UE 702. The transmission, at 1006, may be performed by the transmission component 1334 of the apparatus 1302 in FIG. 13.

Figure 11:
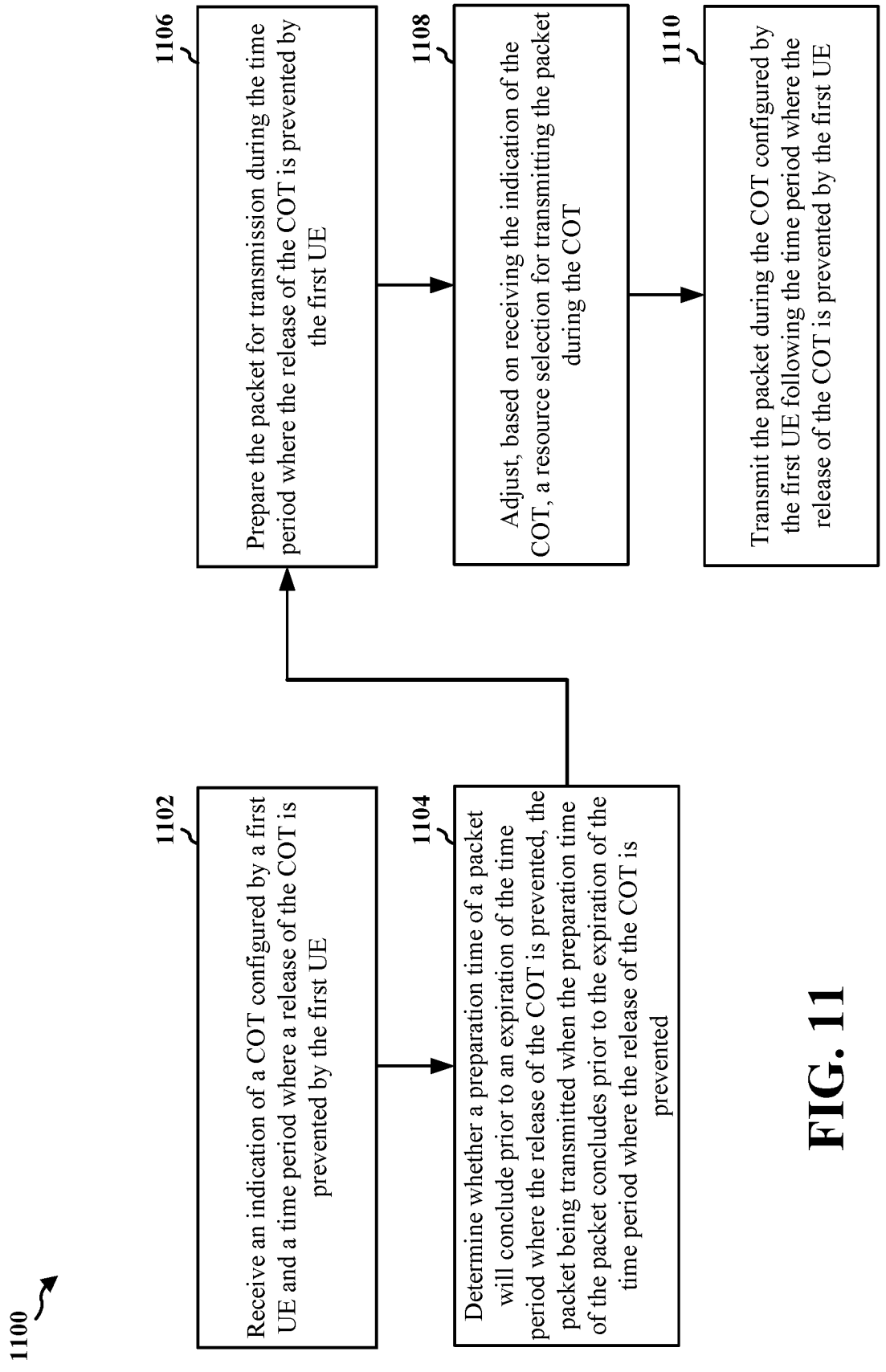
FIG. 11 is a flowchart of a method of wireless communication of a second UE.

FIG. 11 is a flowchart 1100 of a method of wireless communication. The method may be performed by a second UE (e.g., the UE 104, 404, 504, 604, 704; the apparatus 1102; etc.), which may include the memory 360 and which may be the entire UE 104, 404, 504, 604, 704 or a component of the UE 104, 404, 504, 604, 704, such as the TX processor 368, the RX processor 356, and/or the controller/processor 359.

At 1102, the UE may receive an indication of a COT configured by a first UE and a time period where a release of the COT is prevented by the first UE. For example, referring to FIGS. 4 and 7, the second UE 404 may receive an initial transmission, at 412, including an indication of a COT and a COT-retention period of the first UE 402. Similarly, the second UE 704 may receive an initial transmission 710a from the first UE 702 including an indication that the COT will be active for four total slots. In aspects, the indication of the COT and the time period where the release of the COT is prevented may be received (e.g., at 412) via SCI. The reception, at 1102, may be performed by the reception component 1330 of the apparatus 1302 in FIG. 13.

At 1104, the UE may determine whether a preparation time of a packet will conclude prior to an expiration of the time period where the release of the COT is prevented, the packet being transmitted when the preparation time of the packet concludes prior to the expiration of the time period where the release of the COT is prevented. For example, referring to FIGS. 4 and 7, the second UE 404 may determine, at 418, a PPD of the second UE 404 and prepare the packet, at 418, for transmission if the PPD is less than a time period for the COT-retaining transmission(s) 416. At 422, the second UE 404 may transmit the prepared packet without performing a LBT procedure. Similarly, the second UE 704 may determine whether the packet may be prepared prior to an end of the COT-retaining transmission 714a-714b of slot n+1 and slot n+2, so that a transmission of the packet may be performed at slot n+3. The determination, at 1104, may be performed by the determination component 1340 of the apparatus 1302 in FIG. 13.

At 1106, the UE may prepare the packet for transmission during the time period where the release of the COT is prevented by the first UE. For example, referring to FIGS. 4 and 7, the second UE 404 may prepare the packet, at 418, during the COT-retention period corresponding to the COT-retaining transmission(s) 416. Similarly, the second UE 704 may prepare the packet in slot n+1 and/or slot n+2 for the packet transmission 710b at slot n+3. The preparation, at 1106, may be performed by the preparation component 1342 of the apparatus 1302 in FIG. 13.

At 1108, the UE may adjust, based on receiving the indication of the COT, a resource selection for transmitting the packet during the COT. For example, referring to FIG. 4, the second UE 404 may adjust, at 420, packet transmission resources based on the PPD determination, at 418, and the reception, at 412, of the initial transmission. The adjustment, at 1108, may be performed by the adjustment component 1344 of the apparatus 1302 in FIG. 13.

At 1110, the UE may transmit the packet during the COT configured by the first UE following the time period where the release of the COT is prevented by the first UE. For example, referring to FIG. 7, the second UE 704 may perform the packet transmission 710b at slot n+3 during the COT 706 following the COT-retaining transmissions 714a-714b at slot n+1 and slot n+2. The transmission of the packet (e.g., at slot n+3) during the COT 706 may be performed without a LBT procedure of the second UE 704. For example, the transmission of the packet (e.g., at slot n+3) during the COT 706 may be performed based on a LBT procedure of the first UE 702. The transmission, at 1110, may be performed by the transmission component 1334 of the apparatus 1302 in FIG. 13.

Figure 12:
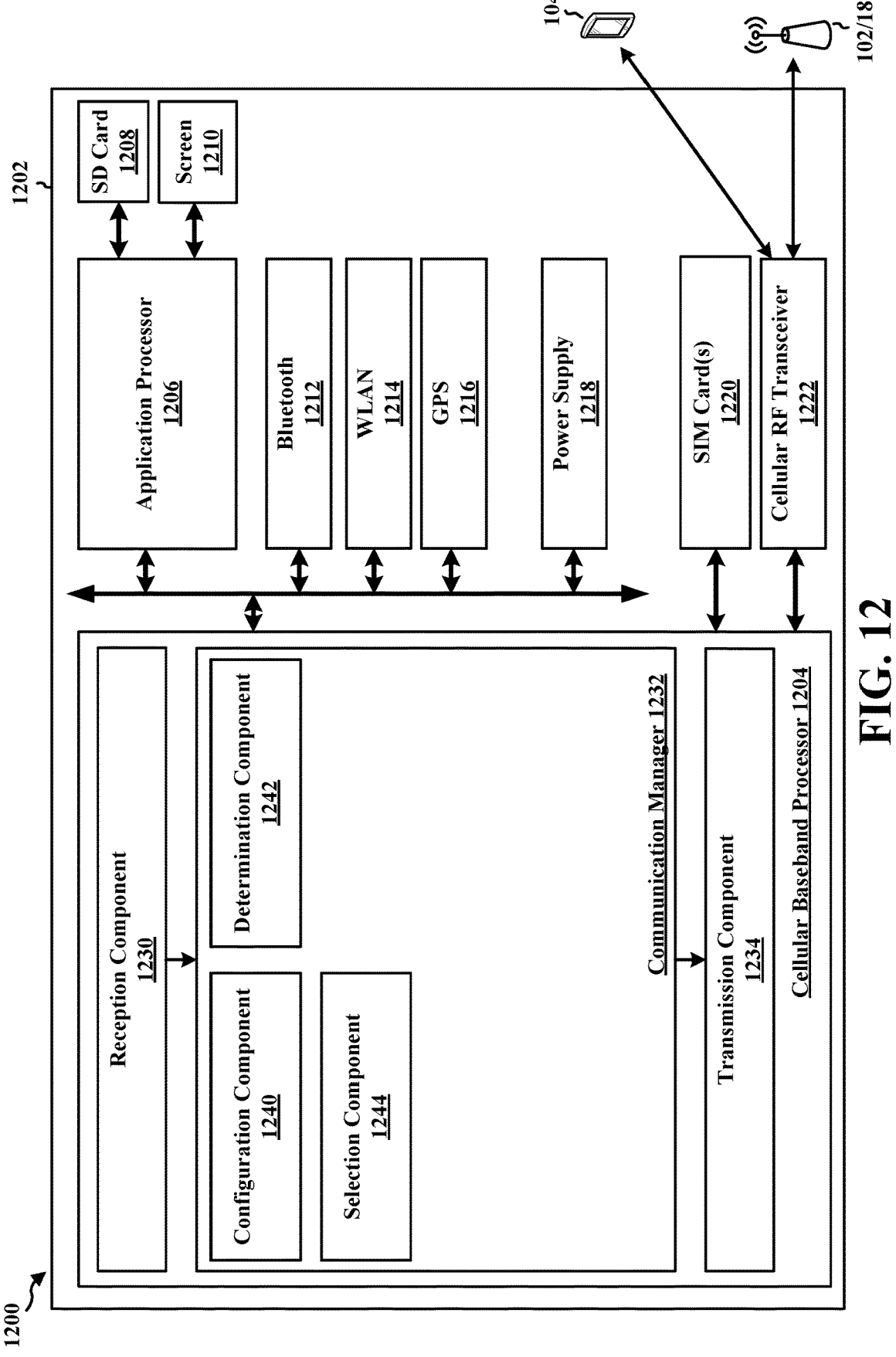
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a configuration component 1240 that is configured, e.g., as described in connection with 802 and 902, to configure a COT based on a LBT procedure; and to configure, during the COT for an initial transmission, one or more subsequent transmissions that follow the initial transmission, the one or more subsequent transmissions configured to prevent a release of the COT. The communication manager 1232 further includes a determination component 1242 that is configured, e.g., as described in connection with 904, 906, and 912, to determine to transmit, during the COT for an initial transmission, one or more subsequent transmissions that follow the initial transmission, the one or more subsequent transmissions configured to prevent a release of the COT; to determine/calculate a time period for transmitting the one or more subsequent transmissions based on at least one of an independent UE procedure, a configuration by a network or a base station, or a predefined protocol; and to determine whether one or more frequency resources selected for transmitting the initial transmission are available for transmitting the one or more subsequent transmissions, the one or more subsequent transmissions being transmitted during the indicated time period on the one or more frequency resources selected for transmitting the initial transmission when the one or more frequency resources selected for transmitting the initial transmission are available. The communication manager 1232 further includes a selection component 1244 that is configured, e.g., as described in connection with 908, to select one or more frequency resources for the one or more subsequent transmissions prior to transmitting the initial transmission. The transmission component 1234 is configured, e.g., as described in connection with 804, 806, 910 and 914, to transmit the initial transmission including an indication of the COT and the time period for transmitting the one or more subsequent transmissions; and to transmit the one or more subsequent transmissions during the indicated time period.

The apparatus may include additional components that perform each of the blocks of the algorithm in the aforementioned flowcharts of FIGS. 8-9. As such, each block in the aforementioned flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for configuring/determining to transmit, during a COT for an initial transmission, one or more subsequent transmissions that follow the initial transmission, the one or more subsequent transmissions configured to prevent a release of the COT; means for transmitting the initial transmission including an indication of the COT and a time period for transmitting the one or more subsequent transmissions; and means for transmitting the one or more subsequent transmissions during the indicated time period. The apparatus 1202 further includes means for calculating/determining the time period for transmitting the one or more subsequent transmissions based on at least one of an independent UE procedure, a configuration by a network or a base station, or a predefined protocol. The apparatus 1202 further includes means for determining whether one or more frequency resources selected for transmitting the initial transmission are available for transmitting the one or more subsequent transmissions, the one or more subsequent transmissions being transmitted during the indicated time period on the one or more frequency resources selected for transmitting the initial transmission when the one or more frequency resources selected for transmitting the initial transmission are available. The apparatus 1202 further includes means for selecting one or more frequency resources for the one or more subsequent transmissions prior to transmitting the initial transmission. The apparatus 1202 further includes means for configuring the COT based on a LBT procedure.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
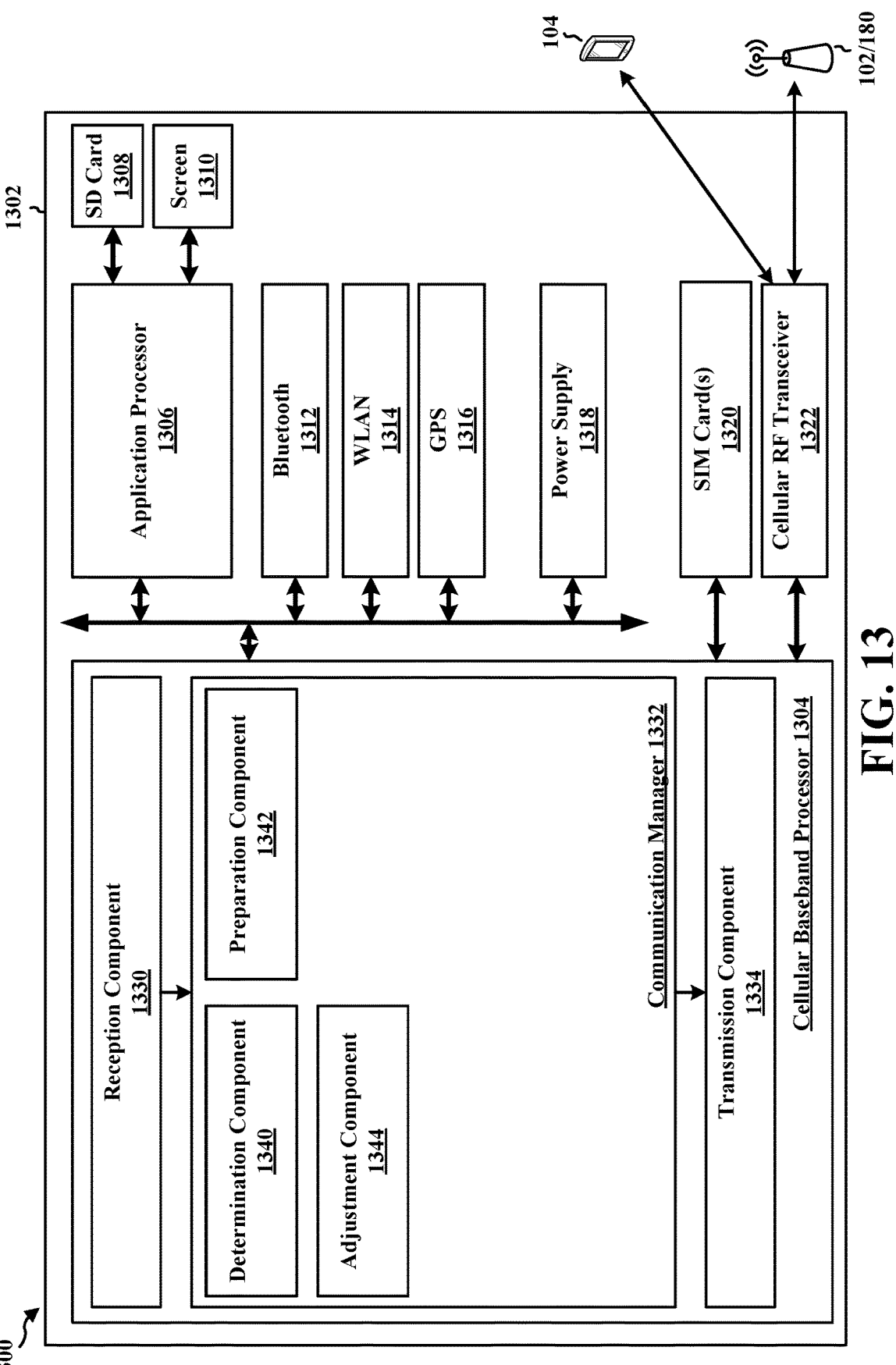
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/ memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/ processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The reception component 1330 is configured is configured, e.g., as described in connection with 1002 and 1102, to receive an indication of a COT configured by a first UE and a time period where a release of the COT is prevented by the first UE. The communication manager 1332 includes a determination component 1340 that is configured, e.g., as described in connection with 1104, to determine whether a preparation time of a packet will conclude prior to an expiration of the time period where the release of the COT is prevented, the packet being transmitted when the preparation time of the packet concludes prior to the expiration of the time period where the release of the COT is prevented. The communication manager 1332 further includes a preparation component 1342 that is configured, e.g., as described in connection with 1004 and 1106, to prepare the packet for transmission during the time period where the release of the COT is prevented by the first UE. The communication manager 1332 further includes an adjustment component 1344 that is configured, e.g., as described in connection with 1108, to adjust, based on receiving the indication of the COT, a resource selection for transmitting the packet during the COT. The transmission component 1334 is configured, e.g., as described in connection with 1006 and 1110, to transmit the packet during the COT configured by the first UE following the time period where the release of the COT is prevented by the first UE.

The apparatus may include additional components that perform each of the blocks of the algorithm in the aforementioned flowcharts of FIGS. 10-11. As such, each block in the aforementioned flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving an indication of a COT configured by a first UE and a time period where a release of the COT is prevented by the first UE; means for preparing a packet for transmission during the time period where the release of the COT is prevented by the first UE; and means for transmitting the packet during the COT configured by the first UE following the time period where the release of the COT is prevented by the first UE. The apparatus 1302 further includes means for determining whether a preparation time of the packet will conclude prior to an expiration of the time period where the release of the COT is prevented, the packet being transmitted when the preparation time of the packet concludes prior to the expiration of the time period where the release of the COT is prevented. The apparatus 1302 further includes means for adjusting, based on receiving the indication of the COT, a resource selection for transmitting the packet during the COT. The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first UE, characterized by: configuring, during a COT for an initial transmission, one or more subsequent transmissions that follow the initial transmission, the one or more subsequent transmissions configured to prevent a release of the COT; transmitting the initial transmission including an indication of the COT and a time period for transmitting the one or more subsequent transmissions; and transmitting the one or more subsequent transmissions during the indicated time period.

Aspect 2 may be combined with aspect 1 and is characterized in that the time period for transmitting the one or more subsequent transmissions corresponds to a packet preparation time of a second UE.

Aspect 3 may be combined with any of aspects 1-2 and is further characterized by calculating the time period for transmitting the one or more subsequent transmissions based on at least one of an independent UE procedure, a configuration by a network or a base station, or a predefined protocol.

Aspect 4 may be combined with any of aspects 1-3 and is characterized in that the COT and the time period for transmitting the one or more subsequent transmissions are indicated via SCI.

Aspect 5 may be combined with any of aspects 1-4 and is further characterized by determining whether one or more frequency resources selected for transmitting the initial transmission are available for transmitting the one or more subsequent transmissions, the one or more subsequent transmissions being transmitted during the indicated time period on the one or more frequency resources selected for transmitting the initial transmission when the one or more frequency resources selected for transmitting the initial transmission are available.

Aspect 6 may be combined with any of aspects 1-5 and is further characterized by selecting one or more frequency resources for the one or more subsequent transmissions prior to transmitting the initial transmission.

Aspect 7 may be combined with aspect 6 and is characterized in that the one or more frequency resources selected for the one or more subsequent transmissions are identical to one or more same frequency resources selected for the initial transmission.

Aspect 8 may be combined with any of aspects 1-7 and is characterized in that the one or more subsequent transmissions include information that is duplicative of same information included in the initial transmission.

Aspect 9 may be combined with any of aspects 1-8 and is characterized in that the configuration of the one or more subsequent transmissions is based on fulfilling a condition for sharing the COT with a second UE.

Aspect 10 may be combined with any of aspects 1-9 and is characterized in that the configuration of the one or more subsequent transmissions is based on a type of the initial transmission.

Aspect 11 may be combined with any of aspects 1-10 and is characterized in that the configuration of the one or more subsequent transmissions is based on a congestion level of a network.

Aspect 12 may be combined with any of aspects 1-11 and is characterized in that the initial transmission initiates the COT, the configuration of the one or more subsequent transmissions based on the initial transmission initiating the COT.

Aspect 13 may be combined with any of aspects 1-12 and is further characterized by configuring the COT based on a LBT procedure.

Aspect 14 may be combined with any of aspects 1-13 and is characterized in that a first time period where the release of the COT is prevented is equal to a sum of a second time period for transmitting the initial transmission and the time period for transmitting the one or more subsequent transmissions.

Aspect 15 may be combined with any of aspects 1-14 and is characterized in that a COT time period for the COT is two or more slots, the time period for transmitting the initial transmission being at least one slot, and the time period for transmitting the one or more subsequent transmissions being one or more slots.

Aspect 16 is a method of wireless communication of a second UE, including: receiving an indication of a COT configured by a first UE and a time period where a release of the COT is prevented by the first UE; preparing a packet for transmission during the time period where the release of the COT is prevented by the first UE; and transmitting the packet during the COT configured by the first UE following the time period where the release of the COT is prevented by the first UE.

Aspect 17 may be combined with aspect 16 and is further characterized by determining whether a preparation time of the packet will conclude prior to an expiration of the time period where the release of the COT is prevented, the packet being transmitted when the preparation time of the packet concludes prior to the expiration of the time period where the release of the COT is prevented.

Aspect 18 may be combined with any of aspects 16-17 and is further characterized by adjusting, based on receiving the indication of the COT, a resource selection for transmitting the packet during the COT.

Aspect 19 may be combined with any of aspects 16-18 and is characterized in that the transmission of the packet during the COT is performed without a LBT procedure of the second UE.

Aspect 20 may be combined with any of aspects 16-19 and is characterized in that the transmission of the packet during the COT is performed based on a LBT procedure of the first UE.

Aspect 21 may be combined with any of aspects 16-20 and is characterized in that the indication of the COT and the time period where the release of the COT is prevented are received via SCI.

Aspect 22 is an apparatus for wireless communication including at least one processor coupled to a memory and configured to implement a method as in any of aspects 1-21.

Aspect 23 may be combined with aspect 22 and further includes at least one of an antenna or a transceiver coupled to the at least one processor.

Aspect 24 is an apparatus for wireless communication including means for implementing a method as in any of aspects 1-21.

Aspect 25 is a non-transitory computer-readable medium storing computer executable code, where the code when executed by a processor causes the processor to implement a method as in any of aspects 1-21.

What is claimed is:

1. An apparatus for wireless communication at a first user equipment (UE), comprising:

memory; and at least one processor coupled to the memory and configured to:

configure, during a channel occupancy time (COT) for an initial transmission, one or more subsequent transmissions that follow the initial transmission, the one or more subsequent transmissions configured to prevent a release of the COT;

transmit the initial transmission including an indication of the COT and a time period for transmission of the one or more subsequent transmissions, wherein the time period for transmission of the one or more subsequent transmissions corresponds to a packet preparation time of a second UE; and transmit the one or more subsequent transmissions during the indicated time period.

2. The apparatus of claim 1, wherein the at least one processor is further configured to calculate the time period for transmission of the one or more subsequent transmissions based on at least one of an independent UE procedure, a configuration by a network or a base station, or a predefined protocol.

3. The apparatus of claim 1, wherein the COT and the time period for transmission of the one or more subsequent transmissions are indicated via sidelink control information (SCI).

4. The apparatus of claim 1, wherein the at least one processor is further configured to determine whether one or more frequency resources selected for transmission of the initial transmission are available for transmission of the one or more subsequent transmissions, the one or more subsequent transmissions is configured to be transmitted during the indicated time period on the one or more frequency resources selected for transmission of the initial transmission when the one or more frequency resources selected for transmission of the initial transmission are available.

5. The apparatus of claim 1, wherein the at least one processor is further configured to select one or more frequency resources for the one or more subsequent transmissions prior to transmitting the initial transmission.

6. The apparatus of claim 5, wherein the one or more frequency resources selected for the one or more subsequent transmissions are identical to one or more same frequency resources selected for the initial transmission.

7. The apparatus of claim 1, wherein the one or more subsequent transmissions include information that is duplicative of same information included in the initial transmission.

8. The apparatus of claim 1, wherein the configuration of the one or more subsequent transmissions is based on fulfilling a condition for sharing the COT with the second UE.

9. The apparatus of claim 1, wherein the configuration of the one or more subsequent transmissions is based on a type of the initial transmission.

10. The apparatus of claim 1, wherein the configuration of the one or more subsequent transmissions is based on a congestion level of a network.

11. The apparatus of claim 1, wherein the initial transmission initiates the COT, the configuration of the one or more subsequent transmissions based on the initial transmission initiating the COT.

12. The apparatus of claim 1, wherein the at least one processor is further configured to configure the COT based on a listen before talk (LBT) procedure.

13. The apparatus of claim 1, wherein a first time period where the release of the COT is prevented is equal to a sum of a second time period for transmission of the initial transmission and the time period for transmission of the one or more subsequent transmissions.

14. The apparatus of claim 1, wherein a COT time period for the COT is two or more slots, the time period for transmission of the initial transmission being at least one slot, and the time period for transmission of the one or more subsequent transmissions being one or more slots.

15. A method of wireless communication at a first user equipment (UE), comprising:

configuring, during a channel occupancy time (COT) for an initial transmission, one or more subsequent transmissions that follow the initial transmission, the one or more subsequent transmissions configured to prevent a release of the COT;

transmitting the initial transmission including an indication of the COT and a time period for transmission of the one or more subsequent transmissions, wherein the time period for transmission of the one or more subsequent transmissions corresponds to a packet preparation time of a second UE; and transmitting the one or more subsequent transmissions during the indicated time period.

16. The method of claim 15, further comprising calculating the time period for transmission of the one or more subsequent transmissions based on at least one of an independent UE procedure, a configuration by a network or a base station, or a predefined protocol.

17. The method of claim 15, wherein the one or more subsequent transmissions include information that is duplicative of same information included in the initial transmission.

18. The method of claim 15, wherein a first time period where the release of the COT is prevented is equal to a sum of a second time period for transmission of the initial transmission and the time period for transmission of the one or more subsequent transmissions.

19. The method of claim 15, wherein a COT time period for the COT is two or more slots, the time period for transmission of the initial transmission being at least one slot, and the time period for transmission of the one or more subsequent transmissions being one or more slots.

\* \* \* \* \*